United States Patent
Liu

(10) Patent No.: US 10,645,740 B2
(45) Date of Patent: *May 5, 2020

(54) TRANSMITTING-END BLUETOOTH DEVICE AND RECEIVING-END BLUETOOTH DEVICE

(71) Applicant: Realtek Semiconductor Corp., Hsinchu (TW)

(72) Inventor: Yu-Hsuan Liu, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,711

(22) Filed: May 13, 2019

(65) Prior Publication Data

US 2019/0357283 A1 Nov. 21, 2019

(30) Foreign Application Priority Data

May 18, 2018 (TW) .............................. 107117049 A

(51) Int. Cl.
*H04W 76/14* (2018.01)
*H04W 4/80* (2018.01)
*H04W 92/18* (2009.01)

(52) U.S. Cl.
CPC ............ *H04W 76/14* (2018.02); *H04W 92/18* (2013.01)

(58) Field of Classification Search
CPC ....... H04W 76/14; H04W 92/18; H04W 4/80; H04W 12/003; H04B 3/544; H04M 17/305
See application file for complete search history.

(56) References Cited

U.S. PATENT DOCUMENTS 9,781,545 B2 * 10/2017 Mao ...................... H04W 8/005
2010/0317289 A1 12/2010 Desai et al.
(Continued)

FOREIGN PATENT DOCUMENTS

CN 101527911 A 9/2009
CN 105099519 A 11/2015

OTHER PUBLICATIONS

Anonymous, "Specification of the Bluetooth System", Covered Core Package version : 4.1, vol. 1, Section 3.3.1.3.1 of Chapter A of vol. 1, Section 2.3.1.1 of Chapter B of vol. 6, Section 2.3.1.3 of Chapter B of vol. 6, Section 2.3.1.4 of Chapter B of vol. 6, Dec. 3, 2013, pp. 53, 40, 41.
Bluetooth Core Specification V5.0, Dec. 6, 2016, vol. 6, Part B Section 4.4.2.4, Section 4.4.2.5, Section 4.4.2.6, Section 4.4.2.12, Section 4.4.3.2; vol. 2, Part E Section 7.7.65.13.
Chinese Office Action and Search Report issued in Chinese Application No. 201410151045.9, dated Feb. 3, 2017, with a partial English translation.

(Continued)

*Primary Examiner* — Andrew Wendell
(74) *Attorney, Agent, or Firm* — Birch, Stewart, Kolasch & Birch, LLP

(57) ABSTRACT

A Bluetooth communication system includes: a transmitting-end Bluetooth device arranged to operably insert an auto-pairing request and a source Bluetooth device address into one or more target packets when the transmitting-end Bluetooth device wants to initiate a Bluetooth auto-pairing procedure, and arranged to operably transmit the one or more target packets when operating under a transmitting-end predetermined operating mode; and a receiving-end Bluetooth device arranged to operably receive the one or more target packets when operating under a receiving-end predetermined operating mode, and to parse the one or more target packets to extract the auto-pairing request and the source Bluetooth device address from the one or more target packets. Then, the receiving-end Bluetooth device is enabled to conduct a Bluetooth auto-pairing procedure with the transmitting-end Bluetooth device according to the auto-pairing request and the source Bluetooth device address.

3 Claims, 2 Drawing Sheets

(56) References Cited

U.S. PATENT DOCUMENTS

| | | |
|---|---|---|
| 2011/0081860 A1 | 4/2011 | Brown et al. |
| 2012/0314631 A1 | 12/2012 | Yang et al. |
| 2015/0296329 A1* | 10/2015 | Mao ..................... H04W 8/005 370/338 |
| 2016/0125733 A1* | 5/2016 | Sallas ................... G08C 17/02 398/106 |
| 2017/0303070 A1* | 10/2017 | Batra .................... H04W 76/19 |
| 2017/0374533 A1* | 12/2017 | Batra ........................ H04L 1/16 |
| 2018/0359627 A1* | 12/2018 | Ko ........................... H04W 4/80 |
| 2019/0281449 A1* | 9/2019 | Luo ......................... H04L 63/06 |
| 2019/0373653 A1* | 12/2019 | Kwon .................... H04W 4/80 |

OTHER PUBLICATIONS

Taiwanese Office Action and Search Report issed in Taiwanese Application No. 103119825, dated Feb. 23, 2016, with a partial English translation.
Taiwanese Office Action and Search Report issued in Taiwanese Application No. 107117049, dated Jan. 11, 2019, with a partial English translation.
U.S. Office Action issued in U.S. Appl. No. 14/684,993, dated Dec. 15, 2016.
U.S. Office Action issued in U.S. Appl. No. 14/684,993, dated May 1, 2017.

\* cited by examiner

TRANSMITTING-END BLUETOOTH DEVICE AND RECEIVING-END BLUETOOTH DEVICE

CROSS-REFERENCE TO RELATED APPLICATIONS

This application claims the benefit of priority to Patent Application No. 107117049, filed in Taiwan on May 18, 2018; the entirety of which is incorporated herein by reference for all purposes.

BACKGROUND

The disclosure generally relates to a Bluetooth communication system and, more particularly, to a Bluetooth communication system capable of simplifying the Bluetooth pairing procedure and related transmitting-end Bluetooth devices and receiving-end Bluetooth devices.

Conventional Bluetooth pairing procedure requires the user to issue a Bluetooth device scan command through appropriate input interface (e.g., a touch screen) and then to choose a target device to be connected from a list of available Bluetooth devices. Accordingly, the pairing procedure between two Bluetooth devices requires the user to conduct several manipulation steps so that a Bluetooth bond between the two Bluetooth devices can be established.

The aforementioned approach not only consumes considerable time of the user, but also demands the user to have comprehensive understanding of the user interface of the Bluetooth device. Apparently, the conventional Bluetooth pairing mechanism causes great inconvenience to the user in terms of manipulations, especially for elders, people with poor sight, or people having difficulty in finger manipulations.

SUMMARY

An example embodiment of a Bluetooth communication system is disclosed, comprising: a transmitting-end Bluetooth device, comprising: a transmitting-end Bluetooth transceiver circuit; a packet generating circuit, coupled with the transmitting-end Bluetooth transceiver circuit; and a transmitting-end control circuit, coupled with the transmitting-end Bluetooth transceiver circuit and the packet generating circuit, arranged to operably instruct the packet generating circuit to insert an auto-pairing request and a source Bluetooth device address into one or more target packets when the transmitting-end Bluetooth device initiates a Bluetooth auto-pairing procedure, and arranged to operably control the transmitting-end Bluetooth transceiver circuit to transmit the one or more target packets when the transmitting-end Bluetooth device operates under a transmitting-end predetermined operating mode; and a receiving-end Bluetooth device, comprising: a receiving-end Bluetooth transceiver circuit, arranged to operably receive the one or more target packets when the receiving-end Bluetooth device operates under a receiving-end predetermined operating mode; a packet parsing circuit, coupled with the receiving-end Bluetooth transceiver circuit, arranged to operably parse the one or more target packets to extract the auto-pairing request and the source Bluetooth device address; and a receiving-end control circuit, coupled with the receiving-end Bluetooth transceiver circuit and the packet parsing circuit, arranged to operably conduct the Bluetooth auto-pairing procedure with the transmitting-end Bluetooth device through the receiving-end Bluetooth transceiver circuit according to the auto-pairing request and the source Bluetooth device address to establish one or more Bluetooth bonds between the transmitting-end Bluetooth device and the receiving-end Bluetooth device.

An example embodiment of a transmitting-end Bluetooth device is disclosed, comprising: a transmitting-end Bluetooth transceiver circuit; a packet generating circuit, coupled with the transmitting-end Bluetooth transceiver circuit; and a transmitting-end control circuit, coupled with the transmitting-end Bluetooth transceiver circuit and the packet generating circuit, arranged to operably instruct the packet generating circuit to insert an auto-pairing request and a source Bluetooth device address into one or more target packets when the transmitting-end Bluetooth device initiates a Bluetooth auto-pairing procedure, and arranged to operably control the transmitting-end Bluetooth transceiver circuit to transmit the one or more target packets when the transmitting-end Bluetooth device operates under a transmitting-end predetermined operating mode.

An example embodiment of a receiving-end Bluetooth device is disclosed, comprising: a receiving-end Bluetooth transceiver circuit, arranged to operably receive one or more target packets when the receiving-end Bluetooth device operates under a receiving-end predetermined operating mode; a packet parsing circuit, coupled with the receiving-end Bluetooth transceiver circuit, configured to operably parse the one or more target packets to extract an auto-pairing request and a source Bluetooth device address; and a receiving-end control circuit, coupled with the receiving-end Bluetooth transceiver circuit and the packet parsing circuit, arranged to operably conduct a Bluetooth auto-pairing procedure with a transmitting-end Bluetooth device corresponding to the source Bluetooth device address through the receiving-end Bluetooth transceiver circuit according to the auto-pairing request and the source Bluetooth device address to establish one or more Bluetooth bonds between the transmitting-end Bluetooth device and the receiving-end Bluetooth device.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
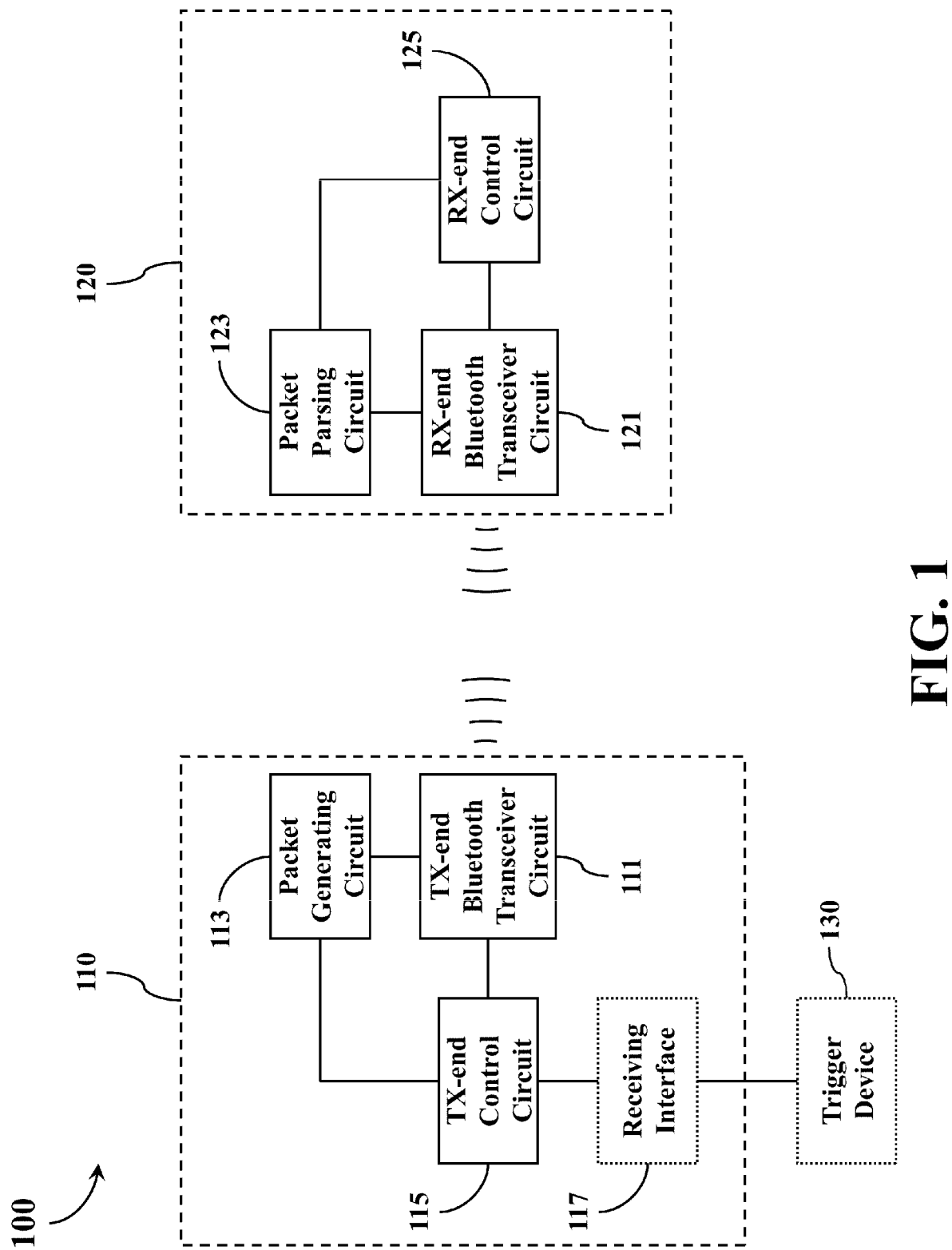
FIG. 1 shows a simplified functional block diagram of a Bluetooth communication system according to one embodiment of the present disclosure.

FIG. 1 shows a simplified functional block diagram of a Bluetooth communication system 100 according to one embodiment of the present disclosure. The Bluetooth communication system 100 comprises a transmitting-end Bluetooth device 110, a receiving-end Bluetooth device 120, and a trigger device 130. Each of the transmitting-end Bluetooth device 110 and the receiving-end Bluetooth device 120 may be a stand-alone device, or may be integrated into other devices.

In the embodiment of FIG. 1, the transmitting-end Bluetooth device 110 comprises a transmitting-end Bluetooth transceiver circuit 111, a packet generating circuit 113, a transmitting-end control circuit 115, and a receiving interface 117. The receiving-end Bluetooth device 120 comprises a receiving-end Bluetooth transceiver circuit 121, a packet parsing circuit 123, and a receiving-end control circuit 125.

In the transmitting-end Bluetooth device 110, the packet generating circuit 113 is coupled with the transmitting-end Bluetooth transceiver circuit 111. The transmitting-end control circuit 115 is coupled with the transmitting-end Bluetooth transceiver circuit 111 and the packet generating circuit 113, and arranged to operably control the packet generating circuit 113 to insert an auto-pairing request and a source Bluetooth device address into one or more target packets when the transmitting-end Bluetooth device 110 begins a Bluetooth auto-pairing procedure. The transmitting-end control circuit 115 is further arranged to operably control the transmitting-end Bluetooth transceiver circuit 111 to transmit the one or more target packets when the transmitting-end Bluetooth device 110 operates under a transmitting-end predetermined operating mode. The receiving interface 117 is coupled with the transmitting-end control circuit 115, and arranged to operably receive a user trigger signal from the trigger device 130.

The term "auto-pairing request" as used herein refers to various indication information or command for requesting another wireless device to actively conduct a Bluetooth pairing procedure with the transmitting-end Bluetooth device 110.

In practice, different functional blocks of the transmitting-end Bluetooth device 110 may be realized with separate circuits, or may be integrated into a single circuit chip. In addition, if needed, the transmitting-end Bluetooth transceiver circuit 111 may be coupled with additional antenna devices (not illustrated in the drawings).

In the receiving-end Bluetooth device 120, the receiving-end Bluetooth transceiver circuit 121 is arranged to operably receive the one or more target packets transmitted from the transmitting-end Bluetooth device 110 when the receiving-end Bluetooth device 120 operates under a receiving-end predetermined operating mode. The packet parsing circuit 123 is coupled with the receiving-end Bluetooth transceiver circuit 121, and arranged to operably parse the one or more target packets received by the receiving-end Bluetooth transceiver circuit 121 to extract an auto-pairing request and a source Bluetooth device address. The receiving-end control circuit 125 is coupled with the receiving-end Bluetooth transceiver circuit 121 and the packet parsing circuit 123, and arranged to operably conduct a Bluetooth auto-pairing procedure with the transmitting-end Bluetooth device 110 corresponding to the source Bluetooth device address according to the auto-pairing request and the source Bluetooth device address through the receiving-end Bluetooth transceiver circuit 121, so as to establish one or more Bluetooth bonds between the transmitting-end Bluetooth transceiver circuit 111 and the receiving-end control circuit 125.

In practice, different functional block of the receiving-end Bluetooth device 120 may be realized by separate circuits, or may be integrated into a single circuit chip. In addition, if needed, the receiving-end Bluetooth transceiver circuit 121 may be coupled with additional antenna devices (not illustrated in the drawings).

The foregoing trigger device 130 may be realized with various apparatuses configured to operably generate corresponding user trigger signal in response to the user's simple manipulation, such as a button, a switch, a remote control, a touch screen, a voice-activated device, a gesture-sensing device, a gyroscope, a circuit adopting other signal triggering technology, or a combination of the aforementioned devices. In practice, the trigger device 130 may be installed outside the transmitting-end Bluetooth device 110, or may be integrated into the transmitting-end Bluetooth device 110.

The operations of the Bluetooth communication system 100 will be further described in the following by reference to FIG. 2.

Figure 2:
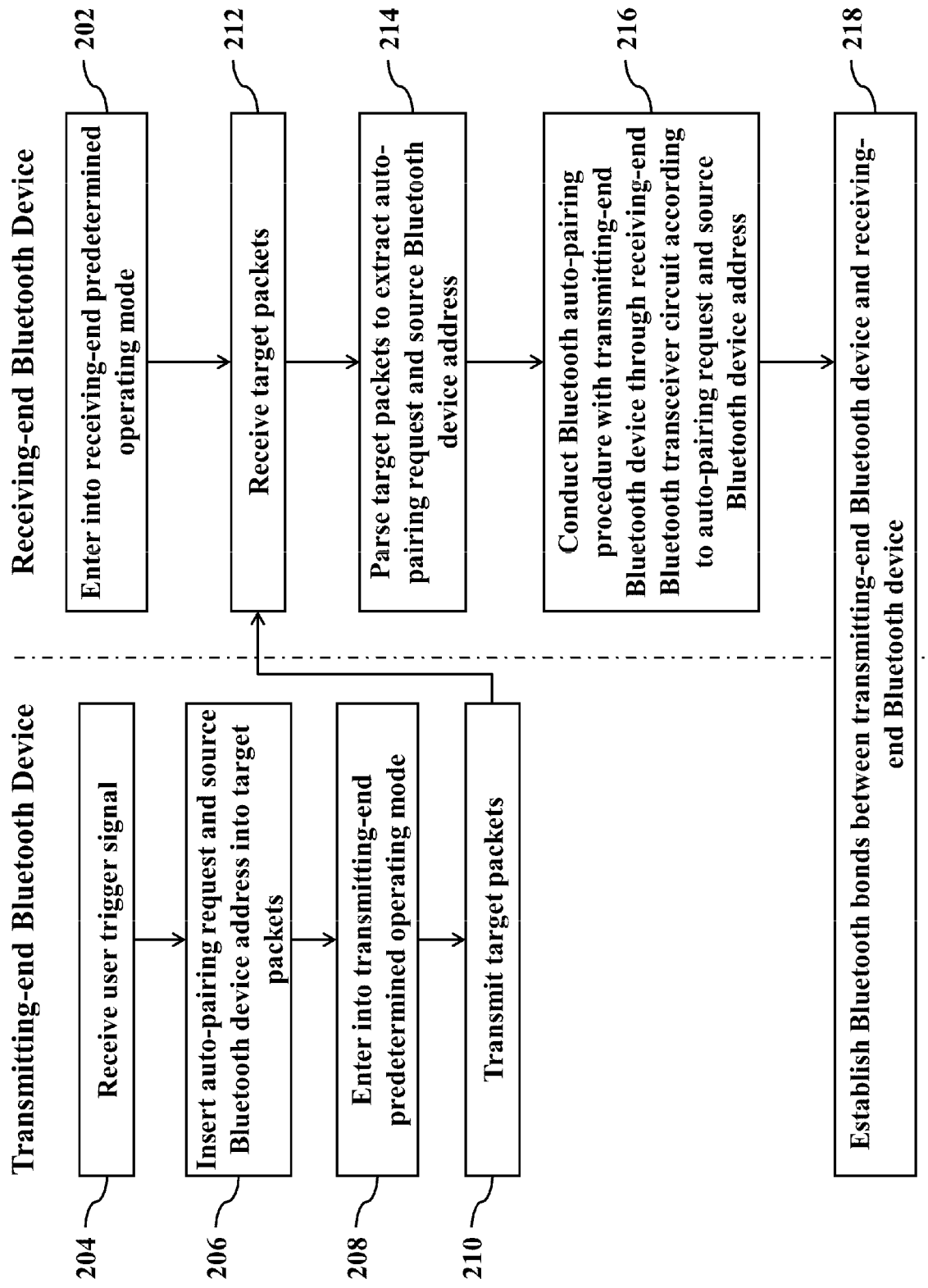
FIG. 2 shows a simplified flowchart of a method for conducting auto-pairing between Bluetooth devices according to one embodiment of the present disclosure.

FIG. 2 shows a simplified flowchart of a method for conducting auto-pairing between Bluetooth devices according to one embodiment of the present disclosure. In FIG. 2, operations within a column under the name of a specific device refer to the operations performed by the specific device. For example, operations within a column under the label "transmitting-end Bluetooth" are operations to be performed by the transmitting-end Bluetooth device 110; whereas operations within a column under the label "receiving-end Bluetooth" are operations to be performed by the receiving-end Bluetooth device 120.

In operations, the receiving-end control circuit 125 may perform the operation 202 according to the user's manipulation or the default operation command of the internal programs at a suitable time point, so as to control the receiving-end Bluetooth device 120 to enter into a receiving-end predetermined operating mode.

For example, the foregoing receiving-end predetermined operating mode may be a LE Extended Passive Scan mode.

For another example, the foregoing receiving-end predetermined operating mode may be a LE Extended Active Scan mode.

For another example, the foregoing receiving-end predetermined operating mode may be a LE Extended Initiator mode.

For yet another example, the foregoing receiving-end predetermined operating mode may be a Periodic Scanning mode.

When the user wants to instruct the transmitting-end Bluetooth device 110 to initiate a Bluetooth auto-pairing procedure with other Bluetooth devices, the user may conduct particular manipulations to the trigger device 130 so as to instruct the trigger device 130 to generate a corresponding user trigger signal. At this time, the receiving interface 117 performs the operation 204 to receive the user trigger signal generated by the trigger device 130.

When the user trigger signal sent from the trigger device 130 is received by the receiving interface 117, the transmitting-end control circuit 115 performs the operation 206.

In the operation 206, the transmitting-end control circuit 115 may instruct the packet generating circuit 113 to insert an auto-pairing request and a source Bluetooth device address corresponding to the transmitting-end Bluetooth device 110 into one or more target packets. For example, the transmitting-end control circuit 115 may instruct the packet generating circuit 113 to insert the auto-pairing request and the source Bluetooth device address into a single target packet or into multiple target packets separately.

In the operation 208, the transmitting-end control circuit 115 may control the transmitting-end Bluetooth device 110 to enter into a transmitting-end predetermined operating mode.

For example, the foregoing transmitting-end predetermined operating mode may be a Scannable mode.

For another example, the foregoing transmitting-end predetermined operating mode may be a Connectable mode.

For another example, the foregoing transmitting-end predetermined operating mode may be a Non-connectable mode.

For another example, the foregoing transmitting-end predetermined operating mode may be a Non-scannable mode.

For yet another example, the foregoing transmitting-end predetermined operating mode may be a Periodic Advertising mode.

Afterwards, the transmitting-end control circuit 115 performs the operation 210 to control the transmitting-end Bluetooth transceiver circuit 111 to transmit the one or more target packets generated by the packet generating circuit 113.

In some embodiments where the transmitting-end predetermined operating mode is the Scannable mode, the Connectable mode, the Non-connectable mode, or the Non-scannable mode, the one or more target packets stated in the foregoing operation 206 and the operation 210 may refer to one or more auxiliary advertising indication (AUX_ADV_IND) packets. Alternatively, the one or more target packets stated in the foregoing operation 206 and the operation 210 may refer to a group of packets formed by one or more extended advertising indication (ADV_EXT_IND) packets, and one or more auxiliary advertising indication packets. In this situation, if the receiving-end Bluetooth device 120 operates under the LE Extended Passive Scan mode, the LE Extended Active Scan mode, or the LE Extended Initiator mode at that time, the receiving-end Bluetooth transceiver circuit 121 performs the operation 212 to receive the one or more target packets transmitted from the transmitting-end Bluetooth transceiver circuit 111.

In some embodiments where the transmitting-end predetermined operating mode is the Non-connectable mode or the Non-scannable mode, the one or more target packets stated in the foregoing operation 206 and the operation 210 may refer to one or more auxiliary chain indication (AUX_CHAIN_IND) packets. Alternatively, the one or more target packets stated in the foregoing operation 206 and the operation 210 may refer to a group of packets formed by one or more extended advertising indication packets, one or more auxiliary advertising indication packets, and one or more auxiliary chain indication packets. In this situation, if the receiving-end Bluetooth device 120 operates under the LE Extended Passive Scan mode at that time, the receiving-end Bluetooth transceiver circuit 121 performs the operation 212 to receive the one or more target packets transmitted from the transmitting-end Bluetooth transceiver circuit 111.

In some embodiments where the transmitting-end predetermined operating mode is the Scannable mode, the one or more target packets stated in the foregoing operation 206 and the operation 210 may refer to one or more auxiliary scan response (AUX_SCAN_RSP) packets. Alternatively, the one or more target packets stated in the foregoing operation 206 and the operation 210 may refer to a group of packets formed by one or more extended advertising indication packets, one or more auxiliary advertising indication packets, and one or more auxiliary scan response packets. Alternatively, the one or more target packets stated in the foregoing operation 206 and the operation 210 may refer to one or more auxiliary scan response packets, and one or more auxiliary chain indication packets. Alternatively, the one or more target packets stated in the foregoing operation 206 and the operation 210 may refer to a group of packets formed by one or more extended advertising indication packets, one or more auxiliary advertising indication, one or more auxiliary scan response packets, and one or more auxiliary chain indication packets. In this situation, if the receiving-end Bluetooth device 120 operates under the LE Extended Active Scan mode at that time, the receiving-end Bluetooth transceiver circuit 121 performs the operation 212 to receive the one or more target packets transmitted from the transmitting-end Bluetooth transceiver circuit 111.

In some embodiments where the transmitting-end predetermined operating mode is the Non-connectable mode, the Non-scannable mode, or the Periodic Advertising mode, the one or more target packets stated in the foregoing operation 206 and the operation 210 may refer to one or more auxiliary synchronous indication (AUX_SYNC_IND) packets. Alternatively, the one or more target packets in the foregoing operation 206 and the operation 210 may refer to a group of packets formed by one or more extended advertising indication packets, one or more auxiliary advertising indication packets, and one or more auxiliary synchronous indication packets. In this situation, if the receiving-end Bluetooth device 120 operates under the Periodic Scanning mode at that time, the receiving-end Bluetooth transceiver circuit 121 performs the operation 212 to receive the one or more target packets transmitted from the transmitting-end Bluetooth transceiver circuit 111.

Afterwards, the packet parsing circuit 123 performs the operation 214 to parse the one or more target packets received by the receiving-end Bluetooth transceiver circuit 121 to extract an auto-pairing request and a source Bluetooth device address.

In the operation 216, the receiving-end control circuit 125 conducts a Bluetooth auto-pairing procedure with the transmitting-end Bluetooth device 110 through the receiving-end Bluetooth transceiver circuit 121 according to the received auto-pairing request and source Bluetooth device address.

According to the auto-pairing request, the receiving-end control circuit 125 can be informed of that a Bluetooth circuit corresponding to the source Bluetooth device address allows other devices to conduct Bluetooth pairing with the transmitting-end Bluetooth device 110. Therefore, the receiving-end control circuit 125 automatically attempts to conduct a Bluetooth pairing procedure with the Bluetooth circuit corresponding to the source Bluetooth device address through the receiving-end Bluetooth transceiver circuit 121, instead of generating a list of available Bluetooth devices for the user to choose from. In other words, the operation 216 performed by the receiving-end Bluetooth device 120 does not require user's involvement or manipulation.

When the foregoing Bluetooth auto-pairing procedure is accomplished, the receiving-end control circuit 125 and the transmitting-end control circuit 115 perform the operation 218 to establish one or more Bluetooth bonds between the transmitting-end Bluetooth device 110 and the receiving-end Bluetooth device 120, that is, to establish one or more Bluetooth bonds between the transmitting-end Bluetooth transceiver circuit 111 and the receiving-end Bluetooth transceiver circuit 121.

It can be appreciated from the foregoing descriptions that when the operating modes of the transmitting-end Bluetooth device 110 and the receiving-end Bluetooth device 120 match one of the aforementioned patterns, the user only needs to conduct a simple manipulation (such as pressing a button, activating a switch, etc.) on the trigger device 130 coupled with the transmitting-end Bluetooth device 110, then the receiving-end Bluetooth device 120 would automatically initiate the Bluetooth pairing procedure with the transmitting-end Bluetooth device 110 to establish Bluetooth bonds.

Accordingly, the foregoing method for conducting auto-pairing between Bluetooth devices described in FIG. 2 may be applied in the Bluetooth communication systems adopting Bluetooth 5.0 (or higher version) communication protocols.

On the other hand, during the period in which the transmitting-end Bluetooth device 110 and the receiving-end Bluetooth device 120 automatically conduct the Bluetooth auto-pairing operation to establish the Bluetooth bonds, the user is not required to issue any Bluetooth scan command, nor to select the device to be paired with. As a result, the required user intervention or interaction can be greatly reduced.

Apparently, the disclosed structure of the Bluetooth communication system 100 effectively simplifies the Bluetooth pairing procedure between two Bluetooth devices, and greatly improves the utilization convenience for the user.

Moreover, in the disclosed structure of the Bluetooth communication system 100, there is no need to arrange any display device for both the transmitting-end Bluetooth device 110 and the receiving-end Bluetooth device 120, and therefore the hardware structures, weights, and volumes of both the transmitting-end Bluetooth device 110 and the receiving-end Bluetooth device 120 can be significantly reduced.

In some of the foregoing embodiments, the transmitting-end control circuit 115 instructs the packet generating circuit 113 to divide the auto-pairing request and the source Bluetooth device address into multiple data segments and insert the multiple data segments into multiple target packets of various packet types in the operation 206. In this way, the data security can be effectively improved during the transmission of the auto-pairing request and the source Bluetooth device address.

Please note that the executing order of the aforementioned operations in FIG. 2 is merely an exemplary embodiment, rather than a restriction to the practical implementations. For example, there is no restriction to the executing order of the operation 202 and the operation 204. In practice, the operation 202 and the operation 204 may be performed at the same time, or the operation 202 may be performed slightly after the operation 204.

In addition, the operation 208 may be performed before the operation 206, or may be performed at the same time with the operation 206. In some embodiments, the operation 208 may be instead performed before the operation 204.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple", phrases "be coupled with," "couples with," and "coupling with" are is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The foregoing is only one better embodiment of the present disclosure. The equivalent change or modification of the claims of the present disclosure fall within the scope of the present disclosure.

What is claimed is:

1. A transmitting-end Bluetooth device (110), comprising:
a transmitting-end Bluetooth transceiver circuit (111);
a packet generating circuit (113), coupled with the transmitting-end Bluetooth transceiver circuit (111); and
a transmitting-end control circuit (115), coupled with the transmitting-end Bluetooth transceiver circuit (111) and the packet generating circuit (113), arranged to operably instruct the packet generating circuit (113) to insert an auto-pairing request and a source Bluetooth device address into one or more target packets when the transmitting-end Bluetooth device (110) initiates a Bluetooth auto-pairing procedure, and arranged to operably control the transmitting-end Bluetooth transceiver circuit (111) to transmit the one or more target packets when the transmitting-end Bluetooth device (110) operates under a Scannable mode, a Connectable mode, a Non-connectable mode, or a Non-scannable mode, so that a receiving-end Bluetooth device (120) operating under a LE Extended Passive Scan mode, a LE Extended Active Scan mode, or a LE Extended Initiator mode is enabled to actively conduct a Bluetooth auto-pairing procedure with the transmitting-end Bluetooth device (110) to establish one or more Bluetooth bonds between the transmitting-end Bluetooth device (110) and the receiving-end Bluetooth device (120);
wherein the one or more target packets comprise:
one or more auxiliary advertising indication (AUX_ADV_IND) packets; or
a group of packets formed by one or more extended advertising indication (ADV_EXT_IND) packets, and one or more auxiliary advertising indication (AUX_ADV_IND) packets.

2. A transmitting-end Bluetooth device (110), comprising:
a transmitting-end Bluetooth transceiver circuit (111);
a packet generating circuit (113), coupled with the transmitting-end Bluetooth transceiver circuit (111); and
a transmitting-end control circuit (115), coupled with the transmitting-end Bluetooth transceiver circuit (111) and the packet generating circuit (113), arranged to operably instruct the packet generating circuit (113) to insert an auto-pairing request and a source Bluetooth device address into one or more target packets when the transmitting-end Bluetooth device (110) initiates a Bluetooth auto-pairing procedure, and arranged to operably control the transmitting-end Bluetooth transceiver circuit (111) to transmit the one or more target packets when the transmitting-end Bluetooth device (110) operates under a Non-connectable mode or a Non-scannable mode, so that a receiving-end Bluetooth device (120) operating under a LE Extended Passive Scan mode is enabled to actively conduct a Bluetooth auto-pairing procedure with the transmitting-end Bluetooth device (110) to establish one or more Bluetooth bonds between the transmitting-end Bluetooth device (110) and the receiving-end Bluetooth device (120);
wherein the one or more target packets comprises:
one or more auxiliary chain indication (AUX_CHAIN_IND) packets; or
a group of packets formed by one or more extended advertising indication packets, one or more auxiliary advertising indication packets, one or more auxiliary scan response (AUX_SCAN_RSP) packets, and one or more auxiliary chain indication packets.

3. A receiving-end Bluetooth device (120), comprising:
- a receiving-end Bluetooth transceiver circuit (121), arranged to operably receive one or more target packets when the receiving-end Bluetooth device (120) operates under a LE Extended Passive Scan mode, a LE Extended Active Scan mode, or a LE Extended Initiator mode;
- a packet parsing circuit (123), coupled with the receiving-end Bluetooth transceiver circuit (121), configured to operably parse the one or more target packets to extract an auto-pairing request and a source Bluetooth device address; and
- a receiving-end control circuit (125), coupled with the receiving-end Bluetooth transceiver circuit (121) and the packet parsing circuit (123), arranged to actively conduct a Bluetooth auto-pairing procedure with a transmitting-end Bluetooth device (110) operating under a Scannable mode, a Connectable mode, a Non-connectable mode, or a Non-scannable mode through the receiving-end Bluetooth transceiver circuit (121) according to the auto-pairing request and the source Bluetooth device address to establish one or more Bluetooth bonds between the transmitting-end Bluetooth device (110) and the receiving-end Bluetooth device (120);

wherein the one or more target packets comprise:

one or more auxiliary advertising indication (AUX_ADV_IND) packets; or a group of packets formed by one or more extended advertising indication (ADV_EXT_IND) packets, and one or more auxiliary advertising indication (AUX_ADV_IND) packets.

* * * * *